United States Patent
Bhan (10) Patent No.: US 10,610,854 B2
(45) Date of Patent: *Apr. 7, 2020

(54) SELF-ACTIVATING HYDROPROCESSING CATALYST HAVING ENHANCED ACTIVITY AND SELF-ACTIVATION CHARACTERISTICS AND ITS USE FOR TREATING RESID FEEDSTOCKS

(71) Applicant: SHELL OIL COMPANY, Houston, TX (US)

(72) Inventor: Opinder Kishan Bhan, Katy, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,176

(22) Filed: Nov. 4, 2015

(65) Prior Publication Data

US 2016/0129428 A1    May 12, 2016

Related U.S. Application Data

(60) Provisional application No. 62/075,963, filed on Nov. 6, 2014.

(51) Int. Cl.
| | |
|---|---|
| *B01J 27/051* | (2006.01) |
| *C10G 45/08* | (2006.01) |
| *B01J 37/28* | (2006.01) |
| *B01J 35/10* | (2006.01) |
| *B01J 37/20* | (2006.01) |

(Continued)

(52) U.S. Cl.
CPC ......... *B01J 27/0515* (2013.01); *B01J 23/883* (2013.01); *B01J 27/19* (2013.01); *B01J 35/108* (2013.01); *B01J 35/1042* (2013.01); *B01J 35/1061* (2013.01); *B01J 37/0009* (2013.01); *B01J 37/0203* (2013.01); *B01J 37/04* (2013.01);

(Continued)

(58) Field of Classification Search
CPC ........ B01J 27/0515; B01J 37/20; C10G 45/08
See application file for complete search history.

(56) References Cited

U.S. PATENT DOCUMENTS

| | | |
|---|---|---|
| 8,114,806 B2 | 2/2012 | Bhan et al. |
| 9,114,386 B2 * | 8/2015 | Bhan ........................ B01J 37/28 |

(Continued)

OTHER PUBLICATIONS

International Search Report dated Apr. 4, 2016 of PCT/US2015/058964 filed Nov. 4, 2015.

*Primary Examiner* — Jun Li
(74) *Attorney, Agent, or Firm* — Charles W. Stewart (57) ABSTRACT

A self-activating catalyst for treating heavy hydrocarbon feedstocks that comprises a calcined particle treated with a sulfoxide compound in the presence of hydrogen. The calcined particle comprises a co-mulled mixture made by co-mulling inorganic oxide powder, molybdenum trioxide powder, and a nickel compound and then forming the co-mulled mixture into a particle that is calcined to thereby provide the calcined particle. The calcined particle comprises from 1 to 10 weight percent molybdenum and nickel that is present in an amount such that the weight ratio of said nickel-to-molybdenum is less than 0.4. The calcined particle has a pore size distribution that contributes to the unique properties of the catalyst. The enhanced self-activating catalyst is used in the hydroprocessing of heavy residue feedstocks that have high nickel, vanadium and sulfur concentrations.

7 Claims, 2 Drawing Sheets

(51) Int. Cl.
  *B01J 23/883*  (2006.01)
  *B01J 37/02*  (2006.01)
  *B01J 27/19*  (2006.01)
  *B01J 37/00*  (2006.01)
  *B01J 37/04*  (2006.01)
  *B01J 37/08*  (2006.01)

(52) U.S. Cl.
  CPC ............ *B01J 37/088* (2013.01); *B01J 37/20* (2013.01); *B01J 37/28* (2013.01); *C10G 45/08* (2013.01)

(56) References Cited

U.S. PATENT DOCUMENTS

| | | |
|---|---|---|
| 2008/0293989 A1 | 11/2008 | Khanmarmedova et al. |
| 2008/0312076 A1* | 12/2008 | Dufresne .................. B01J 8/16 502/220 |
| 2009/0255850 A1* | 10/2009 | Bhan ........................ B01J 21/12 208/15 |
| 2010/0089794 A1* | 4/2010 | Bhan ....................... C10G 45/04 208/15 |
| 2010/0236988 A1 | 9/2010 | Gabrielov et al. |
| 2012/0270728 A1 | 10/2012 | Eijsbouts-Spickova et al. |
| 2012/0322653 A1 | 12/2012 | Johnson et al. |
| 2013/0193035 A1* | 8/2013 | Borremans .......... B01J 31/2295 208/89 |
| 2014/0116924 A1 | 5/2014 | Bhan |

* cited by examiner

SELF-ACTIVATING HYDROPROCESSING CATALYST HAVING ENHANCED ACTIVITY AND SELF-ACTIVATION CHARACTERISTICS AND ITS USE FOR TREATING RESID FEEDSTOCKS

The present non-provisional application claims the benefit of U.S. Provisional Patent Application Ser. No. 62/075,963, filed Nov. 6, 2014, the entire disclosure of which is hereby incorporated by reference.

FIELD OF THE INVENTION

This invention relates to a hydroprocessing catalyst and a hydrotreating process for the treatment of heavy hydrocarbon feedstocks.

BACKGROUND OF THE INVENTION

In the refining of crude oils the heavy cuts including residue often are subjected to catalytic hydroprocessing to remove such components as sulfur, nitrogen, metals, and Conradson carbon through desulfurization, denitrogenation, demetallization, or asphaltene conversion or any combination thereof. Various types of heterogeneous hydroprocessing catalysts are used to promote these reactions by contacting the catalyst with feedstock under conditions of elevated temperature and pressure and in the presence of hydrogen.

A catalyst that is especially useful in the hydroprocessing of high boiling hydrocarbon feedstocks is disclosed in U.S. Publication 2014/0116924 (Bhan). This catalyst further exhibits the particularly unexpected and unique property of being self-activating in that its activity increases with it use. This catalyst comprises a co-mulled mixture of inorganic oxide powder, molybdenum trioxide powder, and a nickel compound that has been calcined. The calcined co-mulled mixture of the catalyst has specifically defined metal loadings and pore structure.

Another related but different catalyst from the aforementioned is disclosed in U.S. Pat. No. 8,114,806 (Bhan). This catalyst is particularly useful in the processing of disadvantaged crude oils to reduce their viscosity but with minimal amounts of sediment formation and hydrogen consumption to yield a crude oil product having one or more properties enhanced over those of the crude oil that is processed using the catalyst. The catalyst includes one or more metals of the columns 6-10 of the periodic table, such as nickel, molybdenum, cobalt, and tungsten, and it has a specifically defined pore structure. The catalyst is made by co-mulling the metals with a support and the resulting mixture is calcined to give the catalyst.

While the aforementioned catalysts have been shown to have good hydroprocessing activity, there are continuing efforts to find new or improved catalyst compositions having increased catalytic activity or improved stability, or both. Any improvement in catalyst activity can result in lowering of the required reactor temperatures in order to obtain a product of a given nitrogen, sulfur, asphaltene, or metal content from a feedstock that is contaminated with these components. The lower reactor temperatures provide for energy savings and will extend the life of a catalyst. There also are ongoing efforts to find more economical methods of manufacturing the catalyst compositions.

Heavy hydrocarbon feedstocks such as vacuum tower bottoms and resids are typically more difficult to hydrotreat to remove such components as sulfur, nitrogen, metals and carbon than the lighter distillate and naphtha feedstocks. Specially designed catalysts that are different from those used for treating the lighter hydrocarbon feedstocks can be required in order to more economically treat the heavier hydrocarbon feedstocks. So, there is an ongoing need to find new or improve catalyst compositions that have good properties for the hydroprocessing of heavy hydrocarbon feedstocks.

It is, therefore, desirable to provide an improved hydroprocessing catalyst having good catalytic activity and stability and which can be economical to manufacture. One particular desire is to provide a hydroprocessing catalyst that is particularly useful in the hydroprocessing of heavy hydrocarbon feedstocks, and, especially such feedstocks that have exceptionally high sulfur and metals concentrations.

Thus, accordingly, provided is a method of making a self-activating hydroprocessing catalyst having enhanced activity, wherein the method comprises co-mulling an inorganic oxide powder, molybdenum trioxide powder, and a nickel compound to provide a co-mulled mixture; forming the co-mulled mixture into a particle; calcining the particle to provide a calcined particle; and treating the calcined particle with a sulfoxide compound in the presence of molecular hydrogen to provide the self-activating hydroprocessing catalyst.

The self-activating hydroprocessing catalyst of the invention comprises: a calcined particle treated with a sulfoxide compound in the presence of hydrogen, wherein the calcined particle comprises a co-mulled mixture made by co-mulling inorganic oxide powder, molybdenum trioxide powder, and a nickel compound that is formed into a particle of a co-mulled mixture that is thereafter calcined; wherein the calcined particle comprises molybdenum in an amount from 1 to 10 weight percent, nickel in an amount such that the weight ratio of nickel-to-molybdenum is less than 0.4; and wherein the weight percents are for the metal and on the basis of the total weight of the calcined particle.

SUMMARY OF THE INVENTION

Also provided is a process for treating heavy hydrocarbon feedstocks, wherein the process comprises: contacting, under process conditions suitable for providing for the self-activation of a self-activating catalyst, a heavy hydrocarbon feedstock having a nickel content in the range of from 2 ppmw to 150 ppmw, a vanadium content in the range of from 5 ppmw to 250 ppmw, and a sulfur content in the range of from 0.3 wt % to 8 wt % with the self-activating catalyst. The self-activating catalyst comprises a calcined particle treated with a sulfoxide compound in the presence of hydrogen, wherein the calcined particle comprises a co-mulled mixture made by co-mulling inorganic oxide powder, molybdenum trioxide powder, and a nickel compound and then forming the co-mulled mixture into a particle that is calcined to thereby provide the calcined particle. The calcined particle comprises molybdenum that is present in an amount in the range of from 1 to 10 weight percent, as metal and based on the total weight of the calcined particle, and nickel that is present in an amount such that the weight ratio of nickel-to-molybdenum is less than 0.4. The calcined particle further has a pore size distribution such that less than 70% of the total pore volume of the calcined particle is in its pores having a diameter in the range of from 70 Å to 150 Å, and at least 10% of the total pore volume of the calcined particle is in its pores having a diameter in the range of from 130 Å to 300 Å, and from 1% to 10% of the total pore volume of the calcined particle is in its pores having a diameter greater than 1000 Å.

An improved self-activating hydroprocessing catalyst has been discovered that exhibits even greater catalytic activity than prior art self-activating catalysts when used in the hydrotreatment of heavy hydrocarbon feedstocks that have significant concentrations of sulfur, nitrogen, metals such as vanadium and nickel, and Conradson carbon. This catalyst is particularly unique in that it exhibits improved catalytic activity and self-activation properties over prior art catalysts such as the self-activating catalyst described and claimed in U.S. Publication 2014/0116924, which disclosure is incorporated herein by reference.

The inventive process utilizes the improved self-activating catalyst of the invention in the treatment of heavy hydrocarbon feedstocks that have concentrations of nickel. In this process, the inventive composition or catalyst is contacted, under suitable process conditions, with the heavy hydrocarbon feedstock in the presence of molecular hydrogen to yield a treated product. The catalytic activity of the composition has an enhanced activity over comparative catalysts and also exhibits the unexpected property of increasing activity with usage or age, i.e., having self-activation characteristics.

The inventive composition comprises a calcined particle treated with a sulfoxide compound in the presence of molecular hydrogen, and, preferably, liquid hydrocarbons from a crude oil distillation cut. The calcined particle comprises a co-mulled mixture of inorganic oxide powder, molybdenum trioxide powder, and a nickel compound, wherein the co-mulled mixture has been formed into a particle that is calcined to thereby provide the calcined particle. The calcined particle further has a specifically defined pore size distribution as described elsewhere herein. The calcined particle may itself be used as the self-activating hydroprocessing catalyst of the invention or it may be used as a component thereof.

The amounts of molybdenum and nickel used to prepare the co-mulled mixture, which is formed to provide the particle that is calcined, are relatively low when compared to the concentration amounts for these metals that are typically used in the prior art hydroprocessing catalysts. And, indeed, one of the features of the inventive composition and process is that the amounts and concentrations of active metals in the catalyst composition of the invention are especially low, but they provide, in combination with the specifically defined physical properties of the composition and the treatment of the calcined particle component of the catalyst with a sulfoxide compound, for a catalyst that is self-activating when it is used in the hydroprocessing of a heavy feedstock having a concentration of nickel that is typically in the form of an organic nickel compound but the nickel may be in other forms as well.

The calcined particle of the invention comprises molybdenum and nickel at concentrations that are relatively low when compared to the concentration of such metals in many of the prior art hydrotreating catalysts. But, the concentrations of these metals are important features of the invention and when used in combination with the specifically defined pore structure of the inventive composition and its treatment with a sulfoxide compound the combination provides for its unique and improved self-activation characteristics.

Thus, the calcined particle generally comprises, consists essentially of, or consists of an inorganic oxide, molybdenum, and nickel, wherein the molybdenum content of the calcined particle is in the range of from 1 to 10 weight percent (wt. %) of the total weight of the calcined particle, calculated as metal, regardless of its actual form, or, in other words, of from 1.5 wt. % to 15 wt. % molybdenum trioxide ($MoO_3$).

It is desirable for the molybdenum to be present in the calcined particle in an amount that is less than 9.5 wt. % (i.e., 14.25 wt. %, calculated as $MoO_3$) and at least 1.5 wt. % (i.e., 2.25 wt. %, calculated as $MoO_3$). In a preferred embodiment, the concentration of molybdenum in the calcined particle is in the range of from 2 wt. % to 9 wt. % (i.e., from 3 wt. % to 13.5 wt. %, calculated as $MoO_3$), and, in a more preferred embodiment, the concentration is in the range of from 2.5 wt. % to 8.5 wt. % (i.e., 3.75 wt. % to 12.75 wt. %, calculated as $MoO_3$). A most preferred concentration range of molybdenum in the calcined particle of the invention is from 3 wt. % to 8 wt. % (i.e., 4.5 wt. % to 12 wt. %, calculated as $MoO_3$).

An important aspect of the invention is that the calcined particle is to have a particularly low concentration of nickel but not too much nickel such that the self-activation properties of the composition are not realized. While not wishing to be bound to any particular theory, it is anyway theorized that the unique properties of the inventive composition allow for the sorption or uptake of nickel from a heavy hydrocarbon feedstock, having a concentration of nickel, when it is contacted with the composition under suitable process conditions. As the nickel is deposited upon or sorbed by the catalyst or calcined particle the activity of the catalyst improves due to the additionally incorporated nickel. The small amount of nickel initially contained in the calcined particle is thought to necessarily be present in order to promote desulfurization activity so as to yield hydrogen sulfide that reacts with the nickel that is present in the feedstock. The resulting nickel sulfide is thought to then migrate to the nickel sites that are initially present in the catalyst.

It is, thus, desirable for the calcined particle to have a low concentration of nickel in an amount such that the weight ratio of nickel-to-molybdenum in the calcined particle is at least or greater than 0.01:1. It is further desirable for the weight ratio of nickel-to-molybdenum in the calcined particle to be less than 0.4:1. Generally, the weight ratio of nickel-to-molybdenum in the calcined particle is to be in the range of from 0.01:1 to 0.35:1. It is preferred for the weight ratio of nickel-to-molybdenum of the calcined particle to be in the range of from 0.01:1 to 0.3:1. The weight ratio is calculated and presented on an elemental basis.

In another embodiment of the inventive composition it may be desirable for the calcined particle to have a low concentration of nickel in an amount such that the atomic ratio of nickel-to-molybdenum in the calcined particle is at least or greater than 0.01:1. It further can be desirable for the atomic ratio of nickel-to-molybdenum in the calcined particle to be less than 0.4:1. Generally, the atomic ratio of nickel-to-molybdenum in the calcined particle of this embodiment is in the range of from 0.01:1 to 0.35:1, and, preferably, within this range, the atomic ratio of nickel-to-molybdenum of the calcined particle is to be in the range of from 0.01:1 to 0.3:1.

The amount of inorganic oxide of the calcined particle may be in the range upwardly to about 98 weight percent of the calcined particle. Typically, the inorganic oxide of the calcined particle is present in an amount in the range of from 70 to 98 weight percent, and, preferably, from 75 to 98 weight percent of the calcined particle.

It further may be desirable for the calcined particle to have a material absence of cobalt. While it is not known with any certainty, it is thought that the presence of a material amount of cobalt in the calcined particle may negatively affect the self-activation properties of the composition and, therefore, an amount of cobalt that might adversely impact the self-activation properties of the calcined particle when it is used in the hydroprocessing of a heavy hydrocarbon feedstock having a concentration of nickel should not be present in the calcined particle.

What is meant herein by the phrase "a material absence of cobalt" is that the composition contains, if any, cobalt at such a concentration that it does not materially affect the self-activation attributes of the calcined particle when it is used in the hydrotreating, e.g., hydrodesulfurization, of a heavy feedstock having a concentration of nickel. The heavy feedstock and nickel concentrations are defined in detail elsewhere herein.

The material absence of cobalt typically will mean that the calcined particle can comprise less than 0.1 weight percent (wt. %) cobalt, calculated as metal and based on the total weight of the calcined particle, regardless of the actual form of the cobalt. Preferably, the cobalt is present in the calcined particle at a concentration of less than 0.075 weight percent and, more preferably, less than 0.05 wt. %. The calcined particle may also have a substantial absence of cobalt.

It has been discovered that the treatment of the calcined particle component of the inventive catalyst with a sulfoxide compound contributes to the formation of a self-activating catalyst having an enhanced catalytic activity. It is further thought that the specific pore structure of the calcined particle component in combination with other features of the inventive catalyst contributes to the self-activation characteristics of the catalyst.

The combination of a specific pore structure, as defined herein, and a relatively low concentration of nickel is believed to provide for the unique self-activation characteristics of the calcined particle when it is used to hydrotreat hydrocarbon feedstocks, and, in particular, heavy hydrocarbon feedstocks having concentrations of nickel. These properties are further enhanced by the treatment of the calcined particle with the specifically identified sulfoxide compounds.

It is further thought that the presence of a material, but not too large of, percentage of the total pore volume of the calcined particle being present in the macropores of greater than 1000 Å along with a relatively large proportion of the total pore volume being present in the moderate size mesopores in the range of from 70 Å to 150 Å provide the right structure that contributes to the mechanism described above and allows for the migration and transportation of nickel into suitable spots within the pores of the composition.

It is also important that the pore structure of the calcined particle have at least 1 percent (%) of its total pore volume to be contained in its pores having a diameter greater than 1000 Å. Also, the calcined particle is to have less than 10% of its total pore volume that is contained in the pores having a diameter greater than 1000 Å. It is preferred that from 2% to 10% of the total pore volume of the calcined particle to be present in its pores having a diameter of greater than 1000 Å, and, more preferred, from 3% to 9% of the total pore volume of the calcined particle is in the pores of diameter greater than 1000 Å.

Concerning the moderate size mesopores of the calcined particle, at least 40% but less than 70% of the total pore volume of the calcined particle is in its pores having a diameter in the range of from 70 Å to 150 Å. Preferably, from 50% to 70% of the total pore volume of the calcined particle is in its pores having a diameter in the range of from 70 Å to 150 Å.

It further is desirable for at least 10% of the total pore volume of the calcined particle to be present in its pores having a diameter in the range of from 130 Å to 300 Å. Preferably, at least 15%, and, more preferably, at least 20% of the total pore volume of the calcined particle is in the pores having a diameter in the range of from 130 Å to 300 Å.

In preparing the calcined particle of the invention the starting materials are mixed, preferably by co-mulling, to form a co-mulled mixture. The essential starting materials in the preparation of the co-mulled mixture include molybdenum trioxide that is preferably in the form of finely divided particles that may be as a dry powder or as particles in a suspension or slurry, a nickel component, and an inorganic oxide material. The inorganic oxide material may be selected from the group consisting of alumina, silica and alumina-silica.

The nickel component may be selected from a group of any suitable nickel compounds that are capable of being mixed with the other components of the co-mulled mixture and to be shaped into a particle that is to be calcined to form the calcined particle of the invention. The nickel component may be nickel in an oxide form, such as nickel oxide, or it may be a nickel salt compound. Nickel oxide compounds that may suitably be used include, for example, hydroxides, nitrates, acetates, and oxides of nickel. One preferred nickel compound that may be used in the preparation of the co-mulled mixture is nickel nitrate.

The formation of the co-mulled mixture may be done by any method or means known to those skilled in the art, including, but not limited to, the use of such suitable types of solids-mixing machines as tumblers, stationary shells or troughs, muller mixers, which are either batch type or continuous type, and impact mixers, and the use of such suitable types of either batch-wise or continuous mixers for mixing solids and liquids or for the formation of paste-like mixtures that are extrudable. Suitable types of batch mixers include, but are not limited to, change-can mixers, stationary-tank mixers, double-arm kneading mixers that are equipped with any suitable type of mixing blade. Suitable types of continuous mixers include, but are not limited to; single or double screw extruders, trough-and-screw mixers and pug mills.

The mixing of starting materials of the calcined particle may be conducted for any suitable time period necessary to properly homogenize the co-mulled mixture. Generally, the blending time may be in the range of upwardly to 2 or more than 3 hours. Typically, the blending time is in the range of from 0.1 hours to 3 hours.

The term "co-mulling" is used broadly in this specification to mean that at least the recited starting materials are mixed together to form a mixture of the individual components of the co-mulled mixture that is preferably a substantially uniform or homogeneous mixture of the individual components of such co-mulled mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous and capable of being agglomerated into formed particles, such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

As already noted, it is an important aspect of the inventive method for at least a major portion of the molybdenum source of the calcined particle to be predominantly molybdenum trioxide. In the mixing or co-mulling of the starting materials of the calcined particle, it is preferred for the molybdenum trioxide to be in a finely divided state either as a finely powdered solid or as fine particles in a suspension or slurry. It is best for the particle sizes of the particulate molybdenum trioxide used in the manufacture of the catalyst to have a maximum dimension of less than 0.5 mm (500 microns, µm), preferably, a maximum dimension of less than 0.15 mm (150 µm), more preferably, less than 0.1 mm (100 µm), and, most preferably, less than 0.075 mm (75 µm).

While it is not known with certainty, it is believed that it is advantageous to the invention for the molybdenum trioxide that is used in the manufacture of the inventive calcined particle to be in the form of as small particles as is practically possible; so, therefore, it is not desired to have a lower limit on the size of the molybdenum trioxide particles used in the manufacture of the calcined particle. However, it is understood that the particle size of the molybdenum trioxide used in the manufacture of the calcined particle will generally have a lower limit to its size of greater than 0.2 microns. Thus, the particle size of the molybdenum trioxide used in the formation of the co-mulled mixture in the manufacture of the inventive calcined particle is preferably in the range of from 0.2 to 150 µm, more preferably, from 0.3 to 100 µm, and, most preferably, from 0.5 to 75 µm. Typically, the size distribution of the molybdenum trioxide particles, whether in a dry powder or a suspension or otherwise, is such that at least 50 percent of the particles have a maximum dimension in the range of from 2 to 15 µm.

Once the starting materials of the calcined particle are properly mixed and formed into the shaped or formed particles, a drying step may advantageously be used for removing certain quantities of water or volatiles that are included within the co-mulled mixture or formed particles. The drying of the formed particles can be conducted at any suitable temperature for removing excess water or volatiles, but, preferably, the drying temperature will be in the range of from about 75° C. to 250° C. The time period for drying the particles is any suitable period of time necessary to provide for the desired amount of reduction in the volatile content of the particles prior to the calcination step.

The dried or undried particles are calcined in the presence of an oxygen-containing fluid, such as air, at a temperature that is suitable for achieving a desired degree of calcination. Generally, the calcination temperature is in the range of from 450° C. (842° F.) to 900° C. (1652° F.). The temperature conditions at which the particles are calcined can be important to the control of the pore structure of the calcined particle. Due to the presence of the molybdenum trioxide in the formed particles, the calcination temperature required to provide for a calcined particle having the required pore structure is higher than typical temperatures required to calcine other compositions containing inorganic oxide materials, especially those that do not contain molybdenum trioxide. But, in any event, the temperature at which the formed particles are calcined to provide the calcined particle is controlled so as to provide the calcined particle having the pore structure properties as described in detail herein. The preferred calcination temperature is in the range of from 510° C. (950° F.) to 820° C. (1508° F.), and, most preferably, from 700° C. (1292° F.) to 790° C. (1454° F.).

A critical feature of the invention is for the calcined particle to be treated with a sulfoxide compound, as opposed to another type of sulfur-containing compound, in the presence of molecular hydrogen at suitable treatment temperature and pressure conditions. It has been found that the treatment of the calcined particle with certain sulfoxide compounds will provide an active self-activating hydroprocessing catalyst exhibiting unexpectedly and significantly higher catalytic activity for hydrodesulfurization than other compositions treated with sulfur compounds that do not contain oxygen such as the polysulfides.

A mechanism that explains this phenomenon is not known with certainty, but it is thought that the significant difference in the catalytic performance of the self-activating catalyst resulting from the treatment of the calcined particle with the sulfoxide compound, as opposed to the calcined particle treated with certain other nonoxygen-containing sulfur compounds, is attributable to the oxygen content of the sulfoxide that may cause the formation of water molecules when the sulfoxide reacts with hydrogen near the surfaces of the metal with the pores of the calcined particle. The presence of water and H2S near the metal surfaces during sulfidation affects the dispersion and stacking of the resulting metal sulfide that improves the activity enhancement of the catalyst over alternative sulfiding methods.

The sulfoxide compound that is used in the treatment of the calcined particle is a chemical compound containing a sulfinyl (SO) functional group that is attached to two carbon atoms. The sulfoxide compound of the invention may further be characterized as a polar aprotic solvent. It is within the scope of the definition of the sulfoxide compound that it includes sulfone compounds such as sulfolane.

The sulfoxide of the invention can be represented by the following chemical formula: R1-S(=O)n-R2, wherein R1 is an alkyl, alkenyl, or alkynyl having from 1 to 4 carbon atoms; R2 is alkyl, alkenyl, or alkynyl having from 1 to 4 carbon atoms; wherein R1 and R2 may or may not be bonded together to form a cyclic molecule; and wherein n is either 1 or 2. Examples of sulfoxides include dimethyl sulfoxide, diethyl sulfoxide, methyl ethyl sulfoxide, and sulfolane. Among these, the preferred sulfoxide compound for use in the invention is dimethyl sulfoxide (DMSO).

The treatment of the calcined particle can be accomplished by contacting it with the sulfoxide compound of the invention in the presence of molecular hydrogen under suitable treatment pressure and treatment temperature conditions and for a sufficient time period so as to provide a treated calcined particle having the enhanced activity and self-activation properties of the self-activating hydroprocessing catalyst of the invention.

In conducting the treatment of the calcined particle, the treatment pressure is generally such as to provide a hydrogen partial pressure in the range of from 100 pounds per square inch (psi) to 2,500 psi, or from 250 psi to 2,250 psi, or from 500 psi to 2,000 psi.

The amount of sulfoxide compound contacted with the calcined particle relative to the molecular hydrogen should be in the range of from 0.1 mole of the sulfoxide compound per 100 moles of molecular hydrogen (0.1:100) to 10:100 mole sulfoxide per mole H2, preferably, from 0.5:100 to 8:100, more preferably, from 1:100 to 6:100; and, most preferably, from 2:100 to 4:100.

The treatment temperature at which the molecular hydrogen and sulfoxide compound are contacted with the calcined particle should be in the range of from 120° C. (248° F.) to 370° C. (698° F.), preferably from 130° C. (266° F.) to 350° C. (662° F.), and, more preferably, from 150° C. (302° F.) to 330° C. (626° F.).

The rate at which the hydrogen containing the sulfoxide compound is contacted with the calcined particle may be such to provide a gaseous hourly space velocity (GHSV) upwardly to or about 10 hr-1. Thus, the GHSV can be in the range of from 0.1 hr-1 to 10 hr-1.

It is preferred for the treatment of the calcined particle to be with a crude oil distillation cut, or as also referred to herein as a petroleum-derived hydrocarbon feedstock, that is spiked with or has added to it a concentration of the sulfoxide compound. In this preferred treatment step, the calcined particle is loaded into a vessel, which may be a reactor vessel or any other suitable vessel for containing a quantity of the calcined particle for treatment thereof, that defines a contacting zone wherein it is contacted with the crude oil distillation cut, having a concentration of the sulfoxide compound, and molecular hydrogen, under suitable treatment conditions so as to provide the self-activating hydroprocessing catalyst of the invention having enhanced activity and self-activation properties.

The crude oil distillation cut, or petroleum-derived hydrocarbon feedstock, used to treat the calcined particle may be any distillation cut from a petroleum crude oil that will suitably provide for the treatment of the calcined particle. Examples of possible petroleum cuts that may be usable in the treatment step include, for example, kerosene, diesel, vacuum gas oil, and resid. For instance, the heavy hydrocarbon feedstock as described in detail elsewhere herein may be used to treat the calcined particle.

Kerosene is another petroleum-derived hydrocarbon feedstock that may be used. Kerosene typically comprises hydrocarbon molecules boiling in the range of from 300° F. to 575° F. or has a T(10) of about or greater than 390° F. or in the range of from 390° F. to 420° F. and a final boiling temperature of about or less than 575° F.

If a gasoline boiling range distillation cut is used as the petroleum-derived hydrocarbon feedstock, its T(10) can be in the range of from 50° C. (122° F.) to 70° C. (158° F.) and the T(90) can be in the range of from 185° C. (365° F.) to 225° C. (437° F.).

The test method to be used for determining boiling temperatures of the gasoline, kerosene, diesel and atmospheric gas oils described herein is ASTM D86.

The preferred distillation cut for the petroleum-derived hydrocarbon feedstock is a middle distillate cut such as straight run diesel. This distillation cut can have a boiling range of from or about 180° C. (356° F.) to or about 370° C. (698° F.), more typically, the boiling range is from or about 200° C. (392° F.) to or about 350° C. (662° F.). The middle distillate cut further can have a T(10) of about or greater than 200° C. (392° F.) or preferably of about or greater than 210° C. (410° F.), or even of about or greater than 215° C. (419° F.). Its T(90) can be about or less than 340° C. (644° F.), or about or less than 320° C. (608° F.) of about or greater than 300° C. (572° F.).

The petroleum-derived hydrocarbon feedstock should have a concentration of added sulfoxide such that its sulfur (as an element) content contributed by the sulfoxide is in the range of from 0.1 to 8 weight percent (wt. %) of the total weight of the petroleum-derived hydrocarbon feedstock. It is preferred for the amount of added sulfoxide to the petroleum-derived hydrocarbon feedstock to be in the range of from 0.5 wt. % to 6 wt. %, and, more preferred, it is in the range of from 1 wt. % to 5 wt. %.

The rate at which the petroleum-derived hydrocarbon feedstock with its concentration of added sulfoxide is contacted with the calcined particles contained in the contacting zone is such as to provide a liquid hourly space velocity (LHSV) that is in the range of from 0.01 hr-1 to 10 hr-1. The preferred LHSV is in the range of from 0.05 hr-1 to 5 hr-1, more preferred from 0.1 hr-1 to 3 hr-1, and, most preferred, from 0.5 hr-1 to 2 hr-1.

The amount of molecular hydrogen introduced into the contacting zone along with the petroleum-derived hydrocarbon feedstock, which comprises a concentration of added sulfoxide, is such as to provide a molar ratio of molecular hydrogen-to-the petroleum-derived hydrocarbon feedstock in the range of from 0.1 to 100 moles H2/moles of hydrocarbon. It is preferred for this ratio of molecular hydrogen-to-hydrocarbon that is contacted with the calcined particle to be in the range of from 0.3 to 60 moles H2/moles of hydrocarbon, more preferred, from 0.5 to 50, and, most preferred, from 0.8 to 40.

The treatment of the calcined particle with the petroleum-derived hydrocarbon feedstock with its concentration of sulfoxide and molecular hydrogen is conducted under suitable treatment pressure and treatment temperature conditions so as to provide the desired inventive self-activating hydroprocessing catalyst. The treatment pressure is generally such as to provide a hydrogen partial pressure in the range of from 100 pounds per square inch (psi) to 2,500 psi, or from 250 psi to 2,250 psi, or from 500 psi to 2,000 psi. The treatment temperature at which the sulfoxide-containing petroleum-derived hydrocarbon feedstock and molecular hydrogen are contacted with the calcined particle should be in the range of from 120° C. (248° F.) to 370° C. (698° F.), preferably from 130° C. (266° F.) to 350° C. (662° F.), and, more preferably, from 150° C. (302° F.) to 300° C. (572° F.).

The calcined particle is contacted with the sulfoxide-containing petroleum-derived hydrocarbon feedstock and molecular hydrogen for a sufficient time period so as to provide the self-activating hydroprocessing catalyst of the invention having enhanced desulfurization catalytic activity. The treatment period can range upwardly to and even exceed 250 hours. Preferably, the treatment time period is in the range up to or about 150 hours. The treatment should, typically, be for a treatment time period of at least 1 hour, and, preferably, for a treatment time period of at least 5 or 10 hours. There is a practical upper time limit at which the incremental improvement in the activation of the self-activating hydroprocessing catalyst per time increment becomes so small that there is no longer any significant benefit from continuing the treatment step.

The inventive self-activating catalyst is particularly useful as a high activity hydroprocessing catalyst for use in the hydroprocessing of a heavy feedstock stream that has high contents of pitch, organic metals such as nickel and vanadium compounds, and sulfur. Generally, in its use in the hydroprocessing of a hydrocarbon feedstock, the calcined particle is contained within a reaction zone, such as that which is defined by a reactor vessel, wherein a hydrocarbon feedstock is contacted with the calcined particle under suitable hydroprocessing reaction conditions and from which a treated hydrocarbon product is yielded.

The preferred hydrocarbon feedstock of the inventive process is a heavy hydrocarbon feedstock. The heavy hydrocarbon feedstock may be derived from any of the high boiling temperature petroleum cuts such as atmospheric tower gas oils, atmospheric tower bottoms, vacuum tower gas oils, and vacuum tower bottoms or resid. It is a particularly useful aspect of the inventive process to provide for the hydroprocessing of a heavy hydrocarbon feedstock that can be generally defined as having a boiling temperature at its 5% distillation point, i.e. T(5), that exceeds 300° C. (572° F.) as determined by using the testing procedure set forth in ASTM D-1160. The invention is more particularly directed to the hydroprocessing of a heavy hydrocarbon feedstock having a T(5) that exceeds 315° C. (599° F.) and, even, one that exceeds 340° C. (644° F.).

The heavy hydrocarbon feedstock further may include heavier hydrocarbons that have boiling temperatures above 538° C. (1000° F.). These heavier hydrocarbons are referred to herein as pitch, and, as already noted, it is recognized that one of the special features of the inventive catalyst or process is that it is particularly effective in the hydroconversion of the pitch content of a heavy hydrocarbon feedstock. The heavy hydrocarbon feedstock may include as little as 10 volume percent pitch or as much as 90 volume percent pitch, but, generally, the amount of pitch included in the heavy hydrocarbon feedstock is in the range of from 20 to 80 volume percent. And, more typically, the pitch content in the heavy hydrocarbon feedstock is in the range of from 30 to 75 volume percent.

The heavy hydrocarbon feedstock further may include significantly high sulfur content. One of the special features of the invention is that it provides for the desulfurization and demetallization of the heavy hydrocarbon feedstock. The sulfur content of the heavy hydrocarbon feedstock is primarily in the form of organic sulfur-containing compounds, which may include, for example, mercaptans, substituted or unsubstituted thiophenes, heterocyclic compounds, or any other type of sulfur-containing compound.

A feature of the invention is that it provides for the desulfurization of the heavy feedstock that has a significantly high sulfur content, such as a sulfur content that is typically much greater than 1 weight percent, so as to provide for a treated hydrocarbon product having a reduced sulfur content, such as a sulfur content of less than 1 weight percent, preferably, less than 0.75 wt. %, and, more preferably, less than 0.5 wt. %.

When referring herein to the sulfur content of either the heavy hydrocarbon feedstock or the treated hydrocarbon product, the weight percents are determined by the use of testing method ASTM D-4294.

The inventive process is particularly useful in the processing of a heavy hydrocarbon feedstock that has a sulfur content exceeding 2 weight percent, and with such a heavy hydrocarbon feedstock, the sulfur content may be in the range of from 2 to 8 weight percent. The inventive catalyst and process are especially useful in the processing of a heavy hydrocarbon feedstock having an especially high sulfur content of exceeding 3 or even 4 weight percent and being in the range of from 3 to 7 weight percent or even from 4 to 6.5 weight percent.

The inventive process utilizes the inventive calcined particle as a catalyst in the hydroprocessing of the heavy hydrocarbon feedstock to provide for the simultaneous desulfurization, denitrogenation, conversion of Microcarbon residue, and removal of vanadium and nickel. In this process, the heavy hydrocarbon feedstock is contacted with the inventive catalyst under suitable hydrodesulfurization and hydroconversion process conditions and the treated hydrocarbon product is yielded.

One embodiment of the inventive process is the processing of a heavy hydrocarbon feedstock that has a significant concentration of nickel, and, as noted above, a significant feature of this embodiment of the inventive process is the use of the inventive calcined particle with its unique physical characteristics and specific metals loading and relatively low nickel content in combination with the heavy hydrocarbon feedstock having a significant nickel content. It is believed that, with the use of the inventive composition and its low nickel content in the treatment of the nickel-containing heavy hydrocarbon feedstock, the activity of catalyst improves as the nickel from the heavy hydrocarbon feedstock is deposited upon or taken up by the catalyst.

The nickel content of the heavy hydrocarbon feedstock of the inventive process, thus, has a concentration of contaminant nickel that is typically in the form of organic nickel compounds. The nickel concentration of the heavy hydrocarbon feedstock typically can be in the range of from 2 ppmw to 250 ppmw. It is desirable for the hydrocarbon feedstock of the inventive process to have a concentration of nickel that is in the range of from 5 ppmw to 225 ppmw, and, it is more desirable for the nickel concentration to be in the range of from 7 ppmw to 200 ppmw.

The heavy hydrocarbon feedstock may also have a vanadium concentration that may typically be in the range of from 5 ppmw to 250 ppmw. It is desirable for the heavy hydrocarbon feedstock to contain as little vanadium as possible, but, the inventive composition provides for demetallization, and, thus, the removal of vanadium from the heavy hydrocarbon feedstock. More typically, the vanadium concentration of the heavy hydrocarbon feedstock is in the range of from 10 ppmw to 225 ppmw.

The treated hydrocarbon product should have a reduced sulfur content that is below that of the heavy hydrocarbon feedstock, such as a sulfur content of less than 1 weight percent. It is recognized that the inventive process, however, may have the capability of effectively desulfurizing the heavy hydrocarbon feedstock to provide the treated hydrocarbon product having a reduced sulfur content of less than 0.5 and even less than 0.4 weight percent based on the amount of catalyst used relative to feed volume.

The enhanced self-activating catalyst of the invention may be employed as a part of any suitable reactor system that provides for the contacting of the catalyst with the heavy hydrocarbon feedstock under suitable hydroprocessing conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the heavy hydrocarbon feedstock into the reactor vessel, and a reactor effluent outlet means, such as an effluent outlet nozzle, for withdrawing the reactor effluent or the treated hydrocarbon product from the reactor vessel.

The inventive process generally operates at a hydroprocessing (hydroconversion and hydrodesulfurization) reaction pressure in the range of from 2298 kPa (300 psig) to 20,684 kPa (3000 psig), preferably from 10,342 kPa (1500 psig) to 17,237 kPa (2500 psig), and, more preferably, from 12,411 kPa (1800 psig) to 15,513 kPa (2250 psig). The hydroprocessing reaction temperature is generally in the range of from 340° C. (644° F.) to 480° C. (896° F.), preferably, from 360° C. (680° F.) to 455° C. (851° F.), and, most preferably, from 380° C. (716° F.) to 425° C. (797° F.).

The flow rate at which the heavy hydrocarbon feedstock is charged to the reaction zone of the inventive process is generally such as to provide a liquid hourly space velocity (LHSV) in the range of from 0.01 hr-1 to 3 hr-1. The term "liquid hourly space velocity", as used herein, means the numerical ratio of the rate at which the heavy hydrocarbon feedstock is charged to the reaction zone of the inventive process in volume per hour divided by the volume of catalyst contained in the reaction zone to which the heavy hydrocarbon feedstock is charged. The preferred LHSV is in the range of from 0.05 hr-1 to 2 hr-1, more preferably, from 0.1 hr-1 to 1.5 hr-1 and, most preferably, from 0.2 hr-1 to 0.7 hr-1.

It is preferred to charge hydrogen along with the heavy hydrocarbon feedstock to the reaction zone of the inventive process. In this instance, the hydrogen is sometime referred to as hydrogen treat gas. The hydrogen treat gas rate is the amount of hydrogen relative to the amount of heavy hydrocarbon feedstock charged to the reaction zone and generally is in the range upwardly to 1781 m3/m3 (10,000 SCF/bbl). It is preferred for the treat gas rate to be in the range of from 89 m3/m3 (500 SCF/bbl) to 1781 m3/m3 (10,000 SCF/bbl), more preferably, from 178 m3/m3 (1,000 SCF/bbl) to 1602 m3/m3 (9,000 SCF/bbl), and, most preferably, from 356 m3/m3 (2,000 SCF/bbl) to 1425 m3/m3 (8,000 SCF/bbl).

ILLUSTRATIVE EXAMPLES

The following examples are presented to further illustrate the invention, but they are not to be construed as limiting the scope of the invention.

Example I

This Example I describes the preparation of the calcined particle of the invention that is treated with the various sulfiding agents as described in Example II.

The calcined particle was prepared by first combining 2100 parts by weight alumina, 63.17 parts by weight nickel nitrate (Ni(NO3)2) dissolved in 85.04 parts by weight deionized water by heating, 217.05 parts by weight molybdenum trioxide (MoO3) powder, and 900 parts by weight crushed regenerated Ni/Mo/P hydrotreating catalyst within a Muller mixer along with 130 parts by weight 69.9% concentrated nitric acid and 30 parts by weight of a commercial extrusion aid. A total of 3222.9 parts by weight of water was added to these components during the mixing. The components were mixed for approximately 30 minutes. The mixture had a pH of 4.12 and an LOI of 55.21 weight percent. The mixture was then extruded using 1.3 mm trilobe dies to form 1.3 trilobe extrudate particles. The extrudate particles were then dried in air for a period of several hours at a temperature of 100° C.

Aliquot portions of the dried extrudate particles were calcined in air each for a period of two hours at a maximum temperature of 788° C. (1450° F.). The final calcined mixture contained 2.2 weight percent nickel metal (2.8 wt. % as NiO), and 7.9% molybdenum metal (11.9 wt. % as MoO3) and 83.6 weight percent of alumina, containing nominal 2% silica, and 1.7% of phosphorus.

Example I

The following Table 1 presents certain properties of the dried and calcined extrudate particles.

TABLE 1

| Properties of Calcined Particle | |
| --- | --- |
| Properties | 788° C. |
| Calcination Temperature | (1450° F.) |
| MoO3 | 11.85 |
| NiO | 2.75 |
| Hg Pore Size Dist. (Angstroms) | percent |
| <70 | 0.18 |
| 70-100 | 4.76 |
| 100-130 | 35.96 |
| 130-150 | 26.26 |
| 150-200 | 19.04 |
| 200-240 | 3.53 |
| 240-300 | 3.00 |
| 300-350 | 1.23 |
| 350-450 | 1.59 |
| 450-600 | 1.23 |
| 600-1000 | 1.06 |
| 1000-5000 | 1.23 |
| >5000 | 0.88 |
| Total Pore Volume, cc/g | 0.66 |
| Medium Pore Diameter, Å | 124 |

Example II

This Example II describes the treatment of the calcined particle of Example I with a sulfoxide compound (DMSO) and a polysulfide compound (di-tert-nonyl polysulfide). Comparative performance data for the treated catalysts is presented in Example III.

The calcined particle of Example I was loaded into a 1.5875 cm (⅝ inch) ID by 127 cm (50 inch) stainless steel tube reactor. The tube reactor was equipped with thermocouples placed in a 0.635 cm (¼ inch) thermowell inserted concentrically into the catalyst bed, and the reactor tube was held within a 132 cm (52 inch) long 5-zone furnace with each of the zones being separately controlled based on a signal from a thermocouple.

The bed of the calcined particle of Example I was loaded into a reactor vessel into which hydrogen gas was introduced. The reactor was maintained at a pressure of 1900 psig. A straight run diesel feedstock spiked with a concentration of either dimethylsulfoxide (DMSO) or di-tert-nonyl polysulfide, depending upon the particular test run, so as to provide a sulfur concentration in the diesel feedstock of 2.5 wt. % was charged to the reactor at a rate so as to provide a liquid hourly space velocity (LHSV) of 1 hr-1. After stepwise ramping of the reactor temperature to 650° F., the temperature was held for two hours and thereafter cooled to 400° F. where it was maintained for a period of time.

Example III

This Example III describes the use of the two sulfided catalysts of Example II in the desulfurization hydrotreatment of a heavy feedstock and presents associated catalyst activity data per age of the catalyst.

After the calcined particles were treated with the sulfur-containing compounds as described above, a heavy hydrocarbon residue feedstock was then charged to the reactor. The heavy hydrocarbon feedstock was charged to the reactor along with hydrogen gas. The reactor was maintained at a pressure of 1900 psig and the feedstock was charged to the reactor at a rate so as to provide a liquid hourly space velocity (LHSV) of 1.00 hr-1 and the hydrogen was charged at a rate of 4,000 SCF/bbl. The temperature of the reactor was set at 371° C. (700° F.).

The distillation properties of the heavy hydrocarbon feedstock as determined by ASTM Method D 7169 are presented in Table 2. Other properties of the heavy hydrocarbon feedstock are presented in Table 3.

TABLE 2

Distillation of Blended Feedstock

| Wt. % | Temperature (° F.) |
|---|---|
| 5 | 281.2 |
| 10 | 583.8 |
| 20 | 691.8 |
| 30 | 770.2 |
| 40 | 834.8 |
| 50 | 898.8 |
| 60 | 966 |
| 70 | 1041.8 |
| 80 | 1128.4 |
| 90 | 1241.6 |
| 95 | 1314.2 |

TABLE 3

Other Properties of the Feedstock

| H (wt %) | 12.18 |
|---|---|
| C (wt %) | 86.51 |
| N (wt %) | 0.16 |
| S (wt %) | 0.984 |
| Ni (ppm) | 8.5 |
| V (ppm) | 19.3 |
| MCR | 6.2 |
| C5 asph | 4.7 |
| C7 asph | 2.3 |

Figure 1:
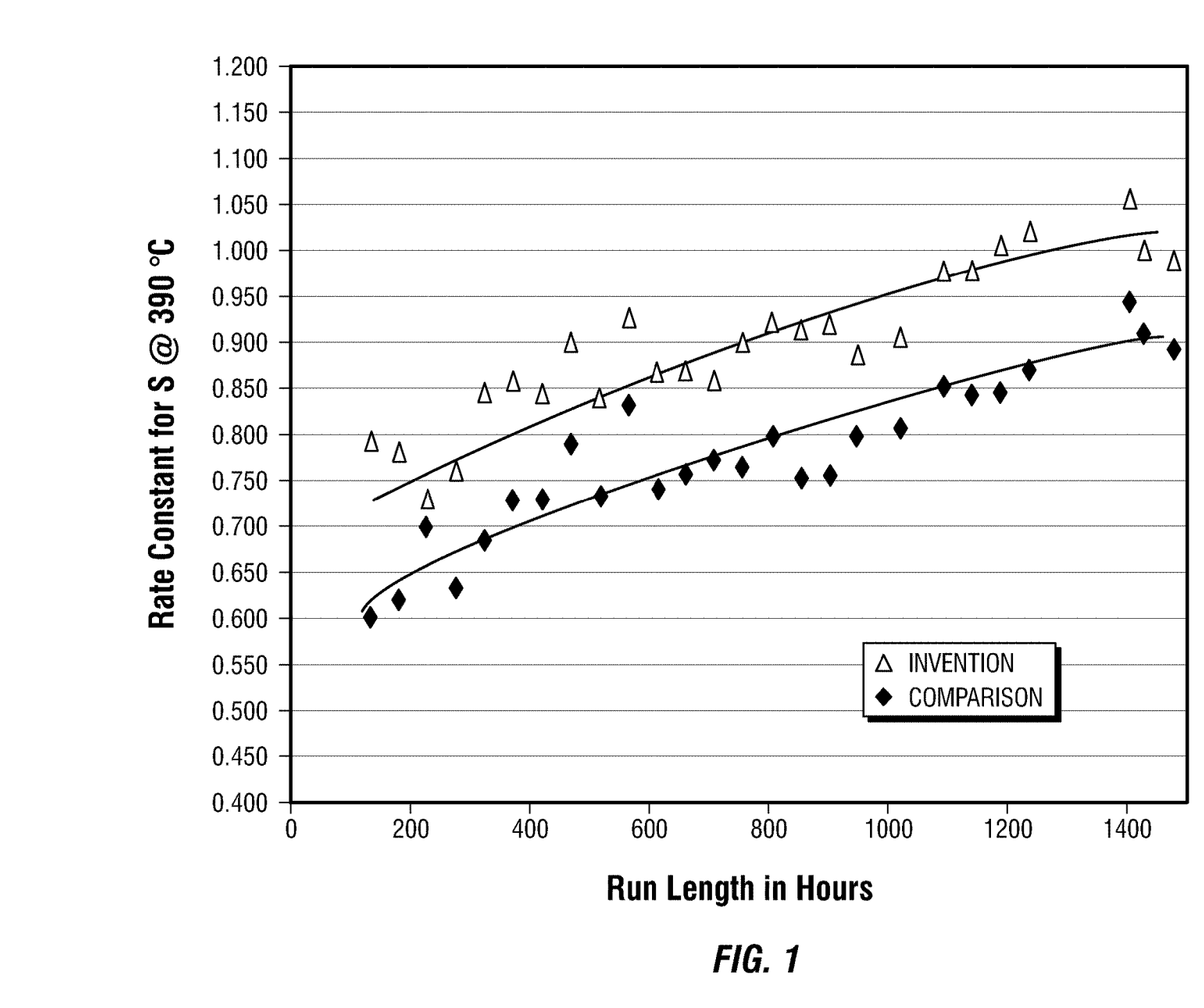
FIG. 1 presents plots of the hydrodesulfurization (HDS) activity as a function of catalyst age for an embodiment of the inventive catalyst and for a comparison catalyst with the rate constants being determined from the use of the catalysts in the hydrodesulfurization of a residue feedstock.

FIG. 1 presents catalyst activity data generated from using the calcined particle treated with the DMSO-spiked diesel feedstock and the calcined particle treated with the nonyl polysulfide-spiked diesel feedstock in the hydrotreatment of the residue feedstock.

The data presented in FIG. 1 presents the rate constant for the comparison catalyst resulting from the treatment of the calcined particle with a nonyl polysulfide-spiked diesel as a function of run length in hours and the inventive catalyst resulting from the treatment of the calcined particle with a DMSO-spiked diesel as a function of run length in hours.

There are several significant observations that may be made from the data presented in FIG. 1. One observation is that for both cases the rate constant for the sulfur-treated composition increases with the length of time of use. The DMSO-treated composition, however, consistently has a much greater rate constant than the one for the polysulfide-treated composition. This is unexpected in that one skilled in the art would not expect the DMSO treatment to yield a self-activating catalyst having a significantly greater rate constant than the self-activating catalyst resulting from a polysulfide treatment. Incremental improvements in catalyst activity continued for both treatments for at least 1400 hours.

Figure 2:
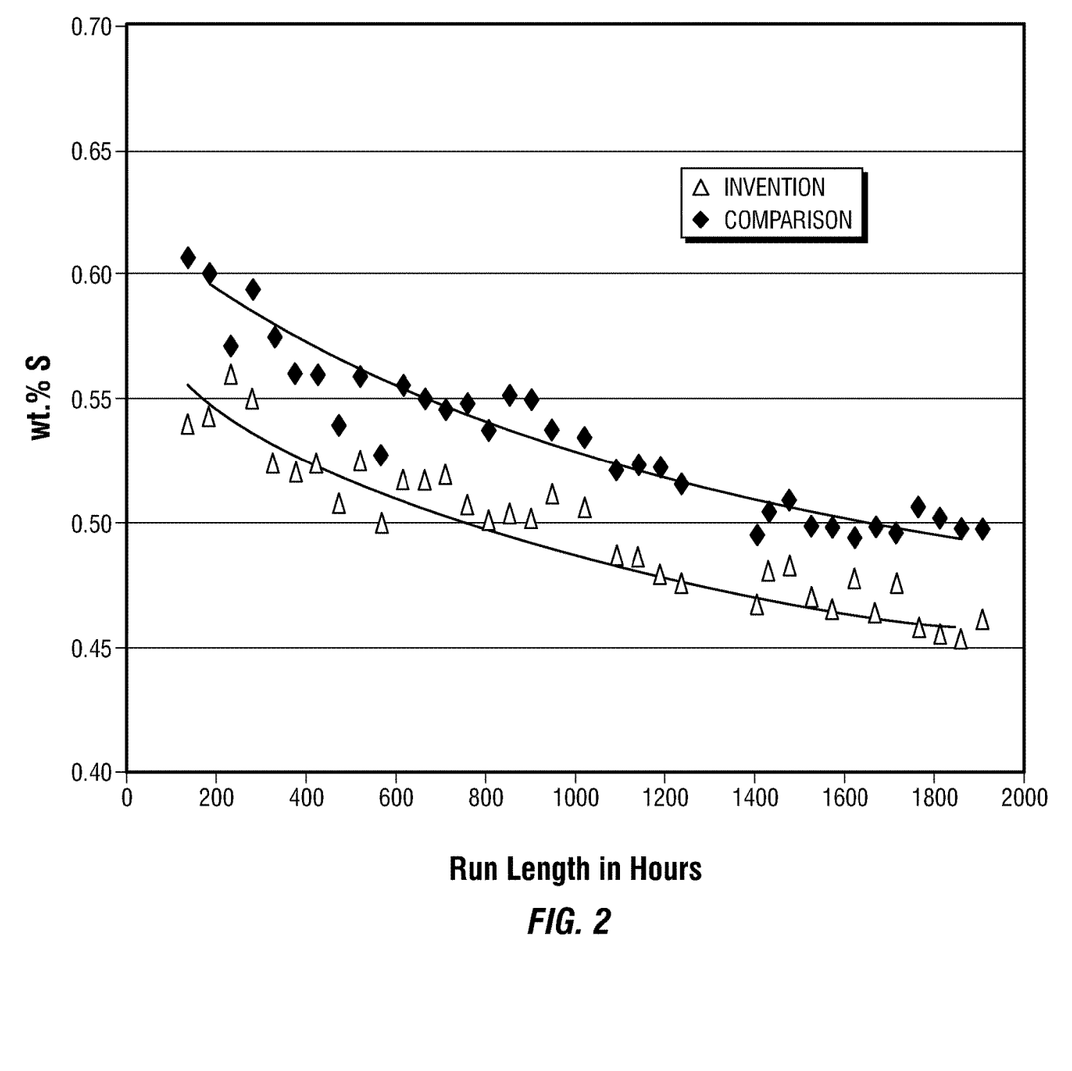
FIG. 2 presents plots of the weight percent of sulfur in reactor product liquid as a function of catalyst age for an embodiment of the inventive catalyst and for a comparison catalyst with the catalysts used in the hydrodesulfurization of a residue feedstock.

FIG. 2 presents performance data for the comparison catalyst treated with the polysulfide and the inventive catalyst treated with the DMSO. Presented is the weight percent sulfur of the treated heavy hydrocarbon feedstock as a function of run time for the two different catalysts. As may be seen from these data, the performance of both of the treated catalysts improves with time in use with a declining percentage of sulfur that is contained in the treated product with run length. It is further observed that the inventive catalyst unexpectedly exhibits a significantly enhanced performance as compared to the comparison catalyst.

It will be apparent to one of ordinary skill in the art that many changes and modifications may be made to the described invention without departing from its spirit and scope as set forth herein.

What is claimed:

1. A method of making a self-activating hydroprocessing catalyst having enhanced activity, wherein said method comprises:

co-mulling an inorganic oxide powder, finely divided particles of molybdenum trioxide, and a nickel compound to provide a co-mulled mixture;

forming said co-mulled mixture into a particle;

calcining said particle under a controlled temperature condition to provide a calcined particle, having a desired pore structure such that from 50% to 70% of its total pore volume is in pores having a diameter in the range of from 70 Å to 150 Å, at least 20% of the total pore volume is in the pores having a diameter in the range of from 130 Å to 300 Å, and from 3% to 9% of the total pore volume is in the pores having a diameter greater than 1,000 Å, and comprising molybdenum in an amount from 1 to 10 weight percent, nickel in an amount such that the weight ratio of nickel-to-molybdenum is less than 0.4; and treating said calcined particle with a sulfoxide compound in the presence of molecular hydrogen to provide said self-activating hydroprocessing catalyst.

2. A method as recited in claim 1, wherein said treating step comprises:

contacting said calcined particle with a crude oil distillation cut, having a concentration of said sulfoxide compound such that the sulfur content of said crude oil distillation cut contributed by said sulfoxide compound is in the range of from 0.1 to 8 wt. % of the total weight of said crude oil distillation cut at a liquid hourly space velocity (LHSV) in the range of from 0.01 hr$^{-1}$ to 10 hr$^{-1}$ and in the presence of said molecular hydrogen in an amount such that the molar ratio of said molecular hydrogen-to-said crude oil distillation cut is in the range of from 0.1 to 100 moles H$_2$/moles hydrocarbon and under treatment conditions such that the treating temperature is in the range of from 120° C. (248° F.) to 370° C. (698° F.) and the treating pressure is in the range of from 250 psia to 2500 psia and for a period of time sufficient to provide said self-activating hydroprocessing catalyst.

3. A method as recited in claim 2, wherein said sulfoxide compound is selected from chemical compounds having the following formula: R$_1$—S(=O)$_n$—R$_2$, wherein, R$_1$ is an alkyl, alkenyl, or alkynyl having from 1 to 4 carbon atoms;

R$_2$ is alkyl, alkenyl, or alkynyl having from 1 to 4 carbon atoms;

n is either 1 or 2; and

R$_1$ and R$_2$ may or may not be bonded together to form a cyclic molecule.

4. A method as recited in claim 3, wherein said controlled temperature condition includes a calcination temperature is in the range of from about 700° C. to 790° C. for a calcination time period that is effective to provide said calcined particle having said desired pore structure.

5. A method as recited in claim 4, wherein said calcined particle comprises molybdenum in an amount that is at least 2 weight percent and less than 9.5 weight percent of the total weight of the calcined particle based on the molybdenum metal.

6. A method as recited in claim 5, wherein said calcined particle comprises less than 0.1 weight percent cobalt based as metal and based on the total weight of said calcined particle.

7. A method as recited in claim 6, wherein said sulfoxide compound is selected from the group consisting of dimethyl sulfoxide, diethyl sulfide, methyl ethyl sulfoxide, and sulfolane.

\* \* \* \* \*